US011899568B2

(12) United States Patent
Kakhki et al.

(10) Patent No.: US 11,899,568 B2
(45) Date of Patent: Feb. 13, 2024

(54) ENRICHED APPLICATION OUTAGE INSIGHTS

(71) Applicant: Cisco Technology, Inc., San Jose, CA (US)

(72) Inventors: Arash Molavi Kakhki, San Francisco, CA (US); Ricardo V. Oliveira, San Francisco, CA (US); Matias Fontanini, San Mateo, CA (US); John Moeses Ercia Bauan, Rome (IT); Dhirendra Kumar Sinha, Santa Clara, CA (US); Rinaldo Buratti, Fiumicino (IT)

(73) Assignee: CISCO TECHNOLOGY, INC., San Jose, CA (US)

( * ) Notice: Subject to any disclaimer, the term of this patent is extended or adjusted under 35 U.S.C. 154(b) by 76 days.

(21) Appl. No.: 17/750,253

(22) Filed: May 20, 2022

(65) Prior Publication Data

US 2023/0036050 A1 Feb. 2, 2023

Related U.S. Application Data

(60) Provisional application No. 63/227,939, filed on Jul. 30, 2021.

(51) Int. Cl.
G06F 11/36 (2006.01)
H04L 67/75 (2022.01)
H04L 43/04 (2022.01)
H04L 41/0677 (2022.01)

(52) U.S. Cl.
CPC ...... *G06F 11/3688* (2013.01); *H04L 41/0677* (2013.01); *H04L 43/04* (2013.01); *H04L 67/75* (2022.05)

(58) Field of Classification Search
CPC .. G06F 11/3688; H04L 67/75; H04L 41/0677; H04L 43/04
See application file for complete search history.

(56) References Cited

U.S. PATENT DOCUMENTS

| 9,645,916 | B2* | 5/2017 | Wingfors ............ G06F 11/3664 |
| 9,847,926 | B2 | 12/2017 | Couture et al. |
| 10,089,215 | B2* | 10/2018 | Duer .................... G06F 21/577 |
| 10,127,125 | B2 | 11/2018 | Krishnan et al. |
| 10,241,848 | B2 | 3/2019 | Patil et al. |
| 10,476,768 | B2 | 11/2019 | Nallabothula et al. |
| 11,163,633 | B2 | 11/2021 | Bangad et al. |
| 2018/0097711 | A1 | 4/2018 | Nallabothula et al. |
| 2019/0109757 | A1 | 4/2019 | Oliveira et al. |

* cited by examiner

*Primary Examiner* — Nadeem Iqbal
(74) *Attorney, Agent, or Firm* — BEHMKE INNOVATION GROUP LLC; James M. Behmke; James J. Wong

(57) ABSTRACT

In one embodiment, a device obtains test results for tests targeted at a web application, the tests performed by a plurality of agents. The device maps a portion of the test results to a component of the web application based on identifying information within the portion of the test results. The device makes, based on the portion of the test results that are mapped to the component of the web application, a determination that the component of the web application is experiencing an outage. In one embodiment, the device causes, based on the determination that the component of the web application is experiencing the outage, a mitigation action for the outage.

20 Claims, 14 Drawing Sheets

| THRESHOLD NAME | EXAMPLE VALUE | EXAMPLE CLEARING VALUE | DESCRIPTION |
|---|---|---|---|
| THRESHOLD_AGENTID_MIN | T1 | DISABLED | MINIMUM # OF AGENTS THAT NEED TO SEE A SERVER DOWN, FOR THE SERVER TO BE CONSIDERED DOWN |
| THRESHOLD_SERVER_MIN | T2 | <T2 | MINIMUM # OF SERVERS OF AN APP THAT NEED TO BE DOWN, FOR THE APP TO BE CONSIDERED DOWN |
| THRESHOLD_SERVER_PERC | T3% | <T3% | MINIMUM % OF SERVERS, OF ALL THE SEEN SERVERS OF AN APP, THAT NEED TO BE DOWN, FOR THE APP TO BE CONSIDERED DOWN |
| THRESHOLD_SERVER_MAX | T4 | <T4 | IF THIS MANY SERVERS BELONGING TO AN APP ARE DOWN, THE THRESHOLD_SERVER_PERC THRESHOLD WILL BE RELAXED AND THE APP IS CONSIDERED DOWN |

FIG. 7

ENRICHED APPLICATION OUTAGE INSIGHTS

RELATED APPLICATION

This application claims priority to U.S. Provisional Appl. Ser. No. 63/227,939, filed Jul. 30, 2021, entitled ENRICHED APPLICATION OUTAGE INSIGHTS, by Kakhki, et al., the contents of which are incorporated herein by reference in its entirety.

TECHNICAL FIELD

The present disclosure relates generally to computer systems, and, more particularly, to enriched application outage insights.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, network monitoring solutions are currently available that allow customers to monitor resources that impact performance of the customers' applications, services, etc. Visibility into such resources may be based on a suite of "agents" or pieces of software that are installed in different locations and devices in different computer and/or communications networks (e.g. around the world). Generally, these agents are configured to perform tests to determine whether a particular computing node is experiencing an outage, thereby affecting nodes surrounding it and, consequently, one or more corresponding resources.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example table of threshold for an aggregation engine of an outage insight service;

DESCRIPTION OF EXAMPLE EMBODIMENTS

Overview

According to one or more embodiments of the disclosure, a device obtains test results for tests targeted at a web application, where the tests are performed by a plurality of agents. The device then maps a portion of the test results to a component of the web application based on identifying information within the portion of the test results. The device makes, based on the portion of the test results that are mapped to the component of the web application, a determination that the component of the web application is experiencing an outage. In one embodiment, the device then causes, based on the determination that the component of the web application is experiencing the outage, a mitigation action for the outage.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
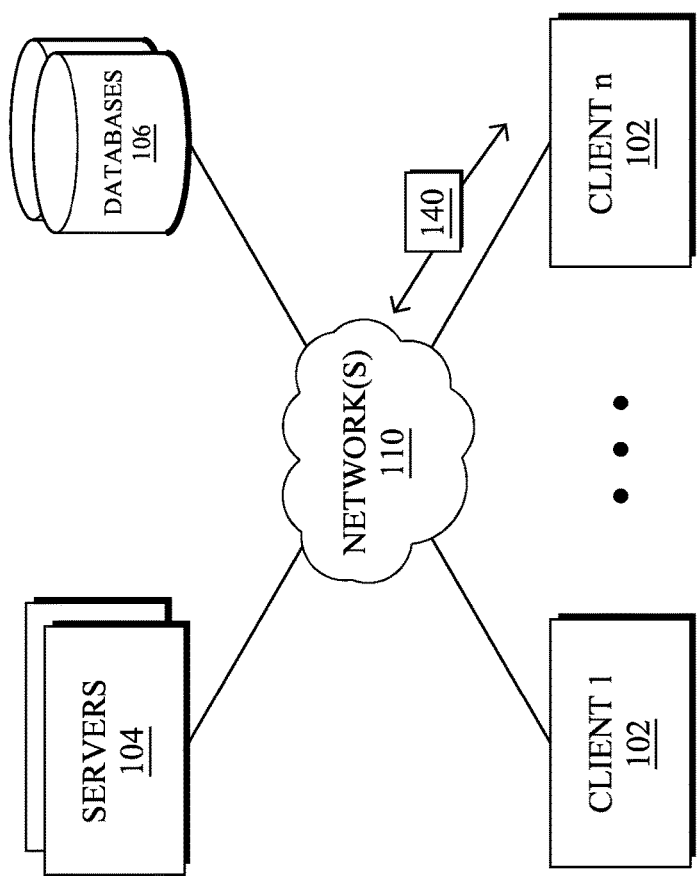
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
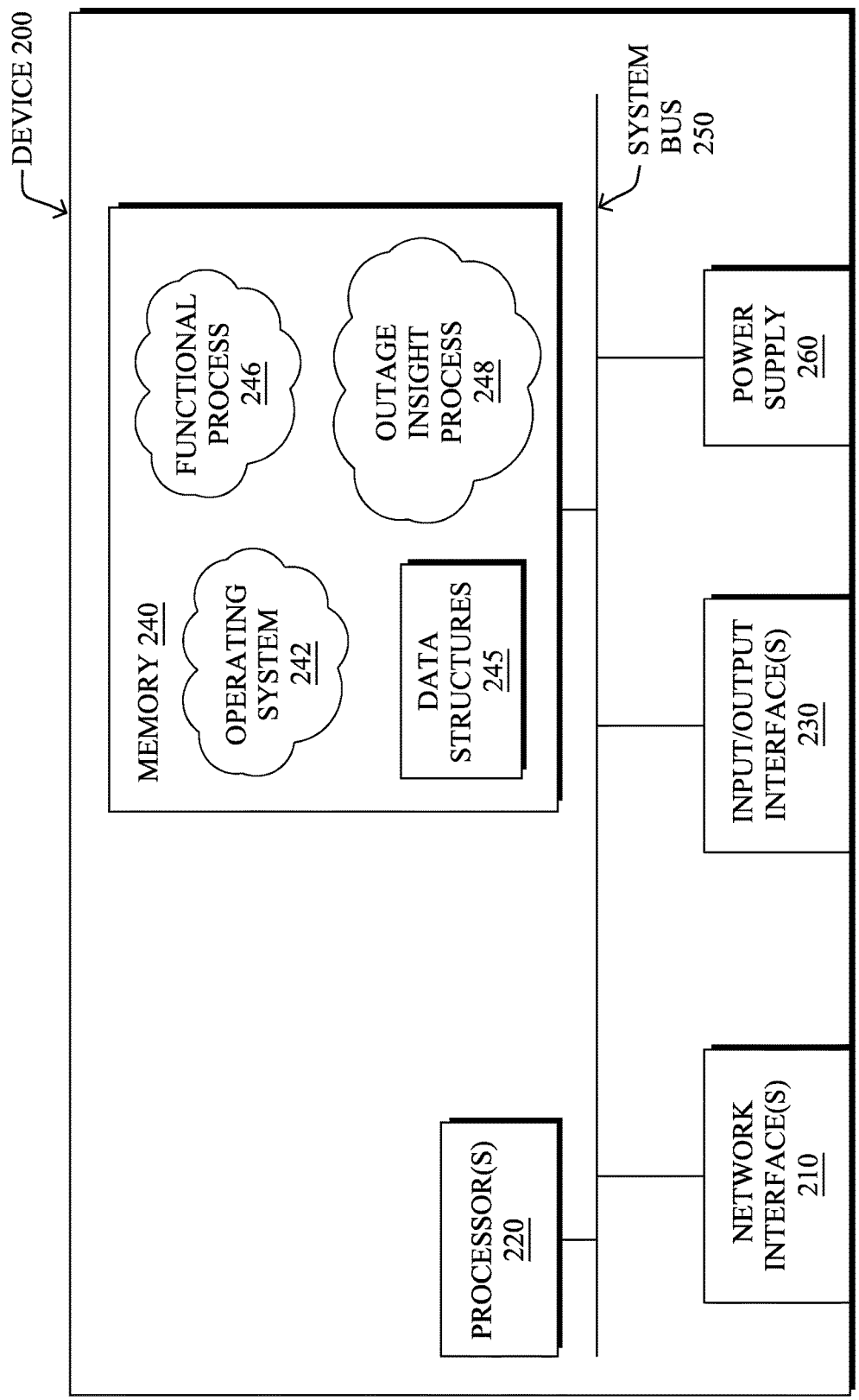
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, for example, wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative outage insight process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Observability Intelligence Platform—

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming, if not impossible (e.g., for a mere user of the SaaS service). For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and end point agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
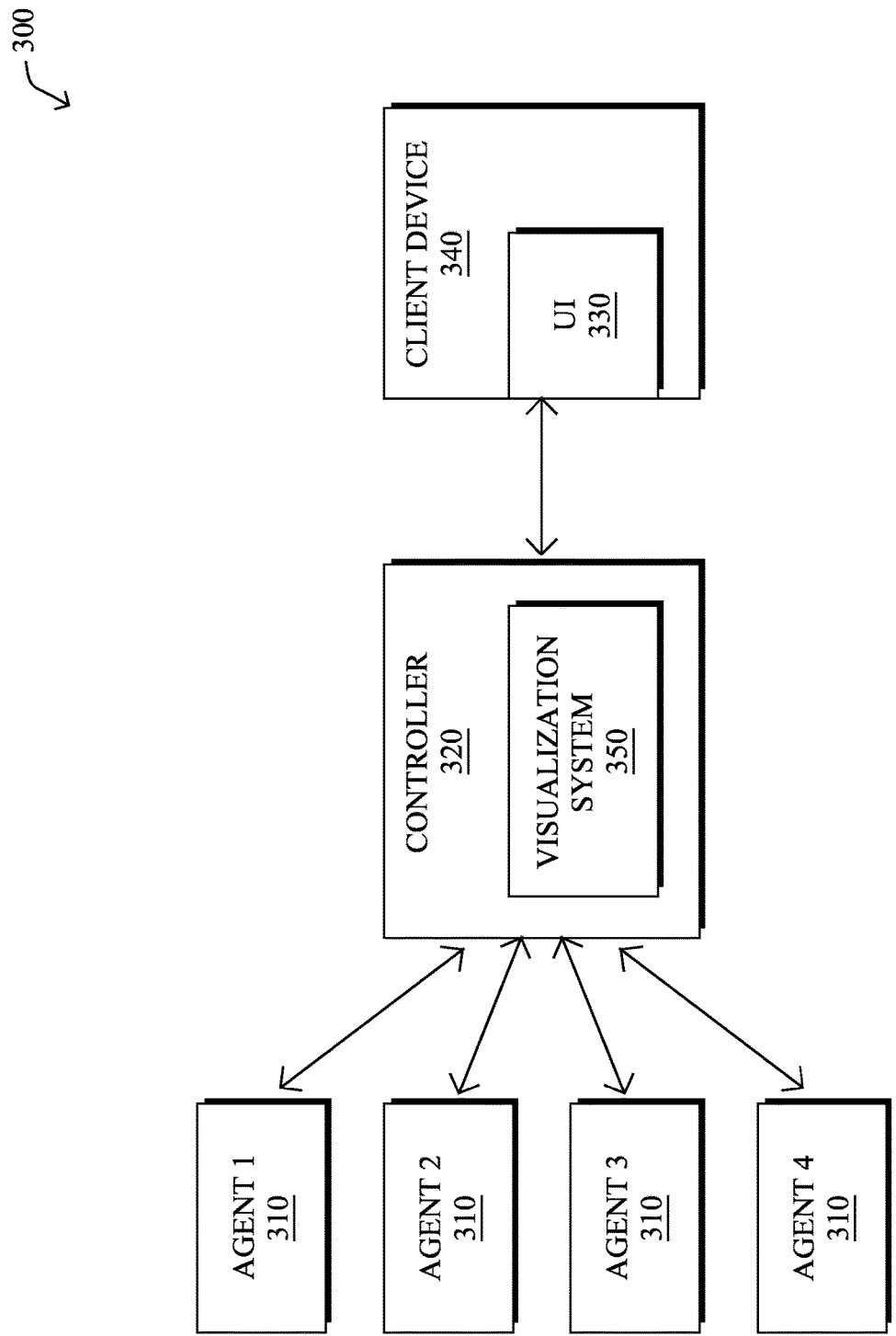
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controller 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, an instance of controller 320 may be installed locally and self-administered.

The controller 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, or a datacenter at the core of the edge of a network, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller.

Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

—Enriched Application Outage Insights—

As noted above, network monitoring solutions are currently available that allow customers to monitor networks and applications that, while not necessarily under the control, management, operation, etc. of the customers, still impact performance of the customers' applications, services, etc. Visibility into such resources may be based on a suite of "agents" or pieces of software that are installed in different locations and devices in different computer and/or communications networks (e.g. around the world).

Examples of different agents, as described herein above, may comprise: a) cloud agents (e.g., deployed and maintained by the network monitoring solution provider), b) enterprise agents (e.g., installed and operated in a customer's network), and c) end point agents, which may be a different version of the previous agents that is installed on actual users' (e.g., employees') devices (e.g., on their web browsers or otherwise). Each of these agents may be configured to run tests from their respective devices, where the tests allow a customer to customize from a suite of tests against different networks and applications or any resource that they are interested in having visibility into. For example, a given test may offer provide visibility into one or more resources of a particular end point (e.g., at a "layer" where the test is being performed). Alternatively, a test may provide visibility into what is in between the end point and another component, for example, how a device is specifically connected through a network to an end resource (e.g., full visibility at various and multiple layers). In operation, essentially, when a customer uses one or more agents to run tests, probe packets travel through the Internet, go through many different networks, measure/monitor a given metric, component, etc., and the network monitoring solution gathers all of that data (e.g., from returned packets, responses, and so on, or, particularly, a lack thereof).

Figure 4A:
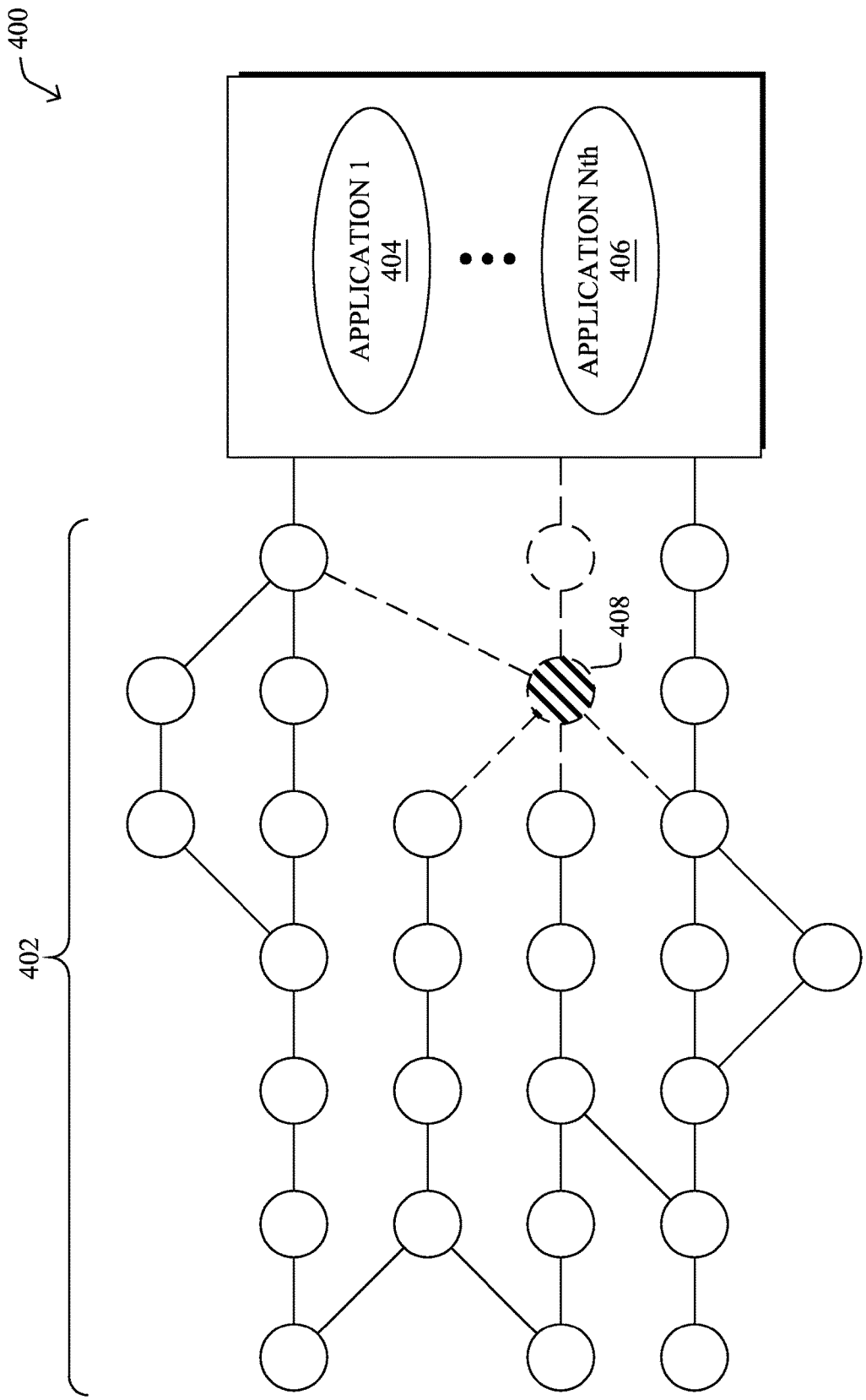
FIGS. 4A-4B illustrate example enriched outage insights that may be provided using one or more agents.
Figure 4B:
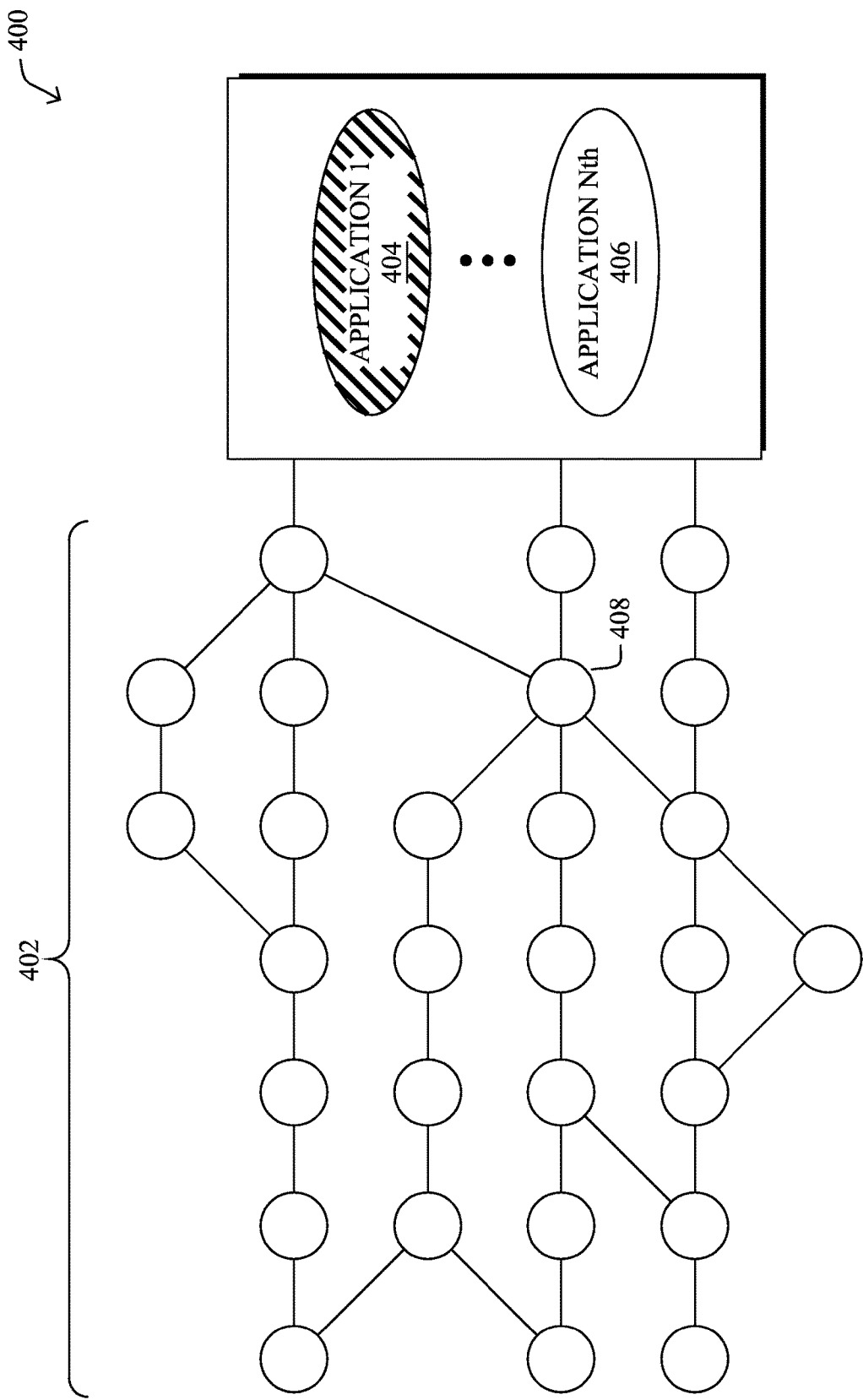

The tests that a given agent performs may comprise HTTP tests (e.g., using curl to connect to a server and load the main document served at the target), Page Load tests (e.g., using a browser to load a full page, in other words, the main document along with all other components that are included in the page), or Transaction tests (e.g., like Page Load test but also performing multiple tasks/steps within given page like, load a shopping website, log in, search for an item, add it to the shopping cart, etc.). From the results of these tests, algorithms can be run on the collective data to detect network outages. For Example, FIGS. 4A-4B illustrate example enriched outage insights that may be provided using one or more agents. In FIG. 4A, a computing network 400 is shown comprising a plurality of nodes 402 that includes end point devices, enterprise devices, and/or cloud devices. According to the techniques described herein above, each of the plurality of nodes 402 may be configured to perform and/or execute one or more agents, where the agents may additionally be configured to access, monitor, etc. a first application 404 to an Nth application 406.

As an example, assume that an internet service provider (ISP) experiences a fiber cut, and parts of computing network 400 go completely down. The tests run above would be able to pinpoint affected customers on a map and demonstrate, topologically, where, in the network and geographically, such a hop failure (e.g., link or node) is within a network diagram. That is, as shown in FIG. 4A, it may be determined that a particular node 408 is experiencing an outage thereby affecting nodes surrounding it (as indicated by dashed lines). Stated another way, the previously mentioned tests above can provide many more details to a customer than simply a news release, such as where the outage happened, what time it happened, what was the scope of the outage in terms of size in terms of geography or in terms of applications that were affected by this, outreach and so on and so forth. While detecting network outages in this manner and with this level of detail is valuable, as shown in FIG. 4A, it is still lacking in full end-to-end visibility, particularly since oftentimes the outage is not inside the network, but it is instead inside within an application itself (i.e., by a component of the application, by a dependency, etc.).

The techniques herein, therefore, are directed toward enriched application outage insights. Stated another way, separately from and in addition to detecting network outages that may occur somewhere within a computing networking, the techniques herein leverage various agents to detect application outages (e.g., at an application layer), which are oftentimes not directly correlated to network outage. That is, a given application (e.g., XYZ.com) may in reality be served from a plurality of locations/servers, and network outage detection may not always be indicative of a component of the application being down. To determine whether the application (or part of the application) is down/unreachable as well as a root cause for its failure, results of various tests performed by agents may be processed and analyzed. Doing so may allow application outages to be distinguished from network outages.

Notably, the application insights herein may be achieved without having control of the application being monitored, meaning, it can be an application used by a customer, but not controlled by the customer. That is, through use of the application insights techniques herein, a customer can monitor for, and/or understand potential causes of outages that are happening on different applications that the customer uses (e.g., an entire enterprise that relies on an outside application for their business operations, such as a sales application).

One or more embodiments of the techniques herein may be based generally on the following steps: obtaining test results from a plurality of agents, mapping results of parts of the test results to a given application, and determining whether the mapped test results are indicative of an application outage. Obtaining the tests results may comprise collecting and enriching application accessibility data (e.g., side channel information). Mapping the results of parts of the test results may comprise mapping customer tests and determining destinations corresponding to particular applications (e.g., a catalog knowing that a particular server belongs to a particular application). The determining step may include identifying whether an error is due to the given application (or another issue like a network layer problem), filtering out 'false positives', and aggregating 'enough' errors such that an application is deemed down (e.g., whether a critical mass has been reached).

Error classification may be implemented to determine that a test in the environment has issues, and what those issues mean (e.g., application or other error type?), such as through various specific errors and/or error combinations that imply an application outage. Further, noise filtering may be implemented to determine whether errors real application errors or issues that produce false positives (e.g., a firewall doing what it's supposed to do should not trigger an application outage). Finally, aggregating may be implemented so as determine a critical mass of monitored incidences has occurred in order to trigger the outage detection (e.g., one minute of an unresponsive service need not equal an application outage.

Specifically, according to one or more embodiments described herein, a device obtains test results for tests targeted at a web application, where the tests are performed by a plurality of agents. The device then maps a portion of the test results to a component of the web application based on identifying information within the portion of the test results. The device makes, based on the portion of the test results that are mapped to the component of the web application, a determination that the component of the web application is experiencing an outage. In one embodiment, the device then causes, based on the determination that the component of the web application is experiencing the outage, a mitigation action for the outage.

Operationally, with reference to FIG. 4B, computing network 400 is illustrated experiencing an outage with application 404 (as opposed to a network outage at node 408). Generally, due to outage of application 404, individuals at end point devices, whether in the United States, Europe, or otherwise, may correspondingly not be able to access application 404 while using a device of plurality of nodes 402. Because there are no outages of the network, however, an outage of application 404 may not necessarily be detected using network outage detection techniques (e.g., by previous systems), and no mitigation action may be triggered. That is, the error was somewhere within the application itself, and not due to a network outage. The application insights techniques herein are able to detect outages that are at the application layer. So, as shown in FIG. 4A, while there might not be any issues in computing network 400, there might be issues in application 404, and the techniques herein can thus detect issues/disruptions in an application.

In addition, although the OSI layer corresponding to applications is layer 7 (as understood in that art), the techniques herein do not merely detect outages at this layer. For example, larger applications may also have their own network, so it could happen that an application is down because there is a network issue inside their internal network, but the techniques herein may be configured to "look" at the application as a whole, in other words, as an end point that a given customer is attempting to "connect" to. In this manner, if an application has some network issue that is manifesting itself as the application not being available, then the techniques herein may correspondingly define that as an application outage. Specifically, as described in greater detail below, the techniques herein are not only able to tell customers that an application server is malfunctioning or completely down/unreachable, but they are also able to enrich the information related to an application outage (e.g., an application outage root cause could be in other layers of the OSI model).

Figure 5:
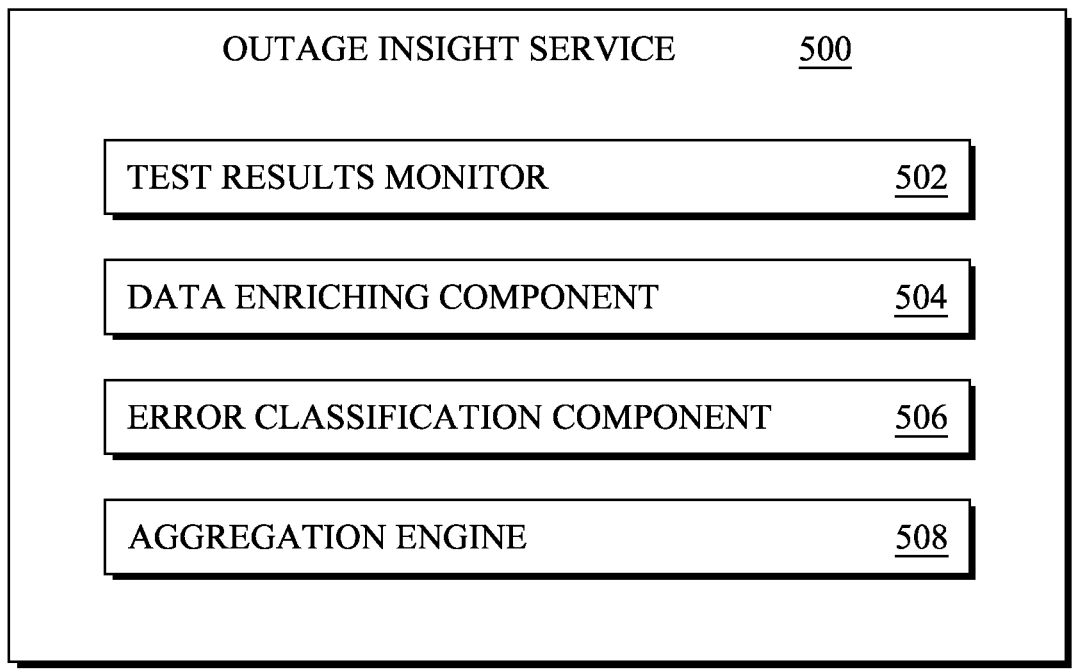
FIG. 5 illustrates an example outage insight service for enriched application outage insights.

Turning to FIG. 5, an example outage insight service for enriched application outage insights is shown. Notably, an agent may be configured to perform, execute, etc. outage insight service 500 that, generally, enables an agent, as described above, to identify application insights at an application layer, without having control of the application being monitor (e.g., the application is used by a customer but not controlled by the customer). Outage insight service 500 may be performed, for example, when outage insight process 248 is executed/performed by the agent (or any other type of agent) at a given computing device. That is, through use of the application insights techniques herein, a customer can monitor and/or understand potential causes of outages that are happening on different applications that the customer uses (e.g., an entire enterprise that relies on an outside application for their business operations, such as a sales application). As previously described, there are a number of steps to detect an outage that various components of outage insight service 500 may perform, where the steps may include: obtaining test results from a plurality of agents, mapping results of parts of the test results to a given application, and determining whether the mapped test results are indicative of an application outage.

To this end, a test results monitor 502 of outage insight service 500 may be configured to receive, send, perform, etc. tests that are collected, processed, and analyzed for enriched application outage insights. For instance, as described below, the source of data for these application outages may illustratively be a series of HTTP requests (e.g., "GETs" or otherwise) that are performed periodically, from hundreds or thousands of application end points within a given computing networking. Additional tests, such as Page Load tests and Transaction tests, may also be used, as well as end point agent data or possibly network tests (e.g., pathtrace, which is used to trace the path from a switch on which the pathtrace command is run, to a destination device or all the devices in a destination domain). It is contemplated that test results monitor 502, may be configured to aggregate this data from many different agent sources (e.g., different customers, over side channels, etc.), providing cross application visibility around all the world and around different verticals.

It is contemplated that test results monitor 502 is configured to gather sufficient data to ensure adequate coverage of an application. For instance, "adequate coverage" may be considered according to one or more thresholds of data points after some certain length of time (e.g., two hours) of processing HTTP data. For example, such thresholds of "enough" data to considered something "covered" may be such things as a minimum number of servers for a Point of Presence (PoP) (e.g., four), a minimum number of organizations for given a PoP (e.g., two, or else ignored if the test is for coverage expansion, such as for internal orgs), a minimum number of PoPs for a region (e.g., two), and so on. Notably, since applications are more centralized compared to networks and autonomous systems (i.e. fewer PoPs), the techniques herein may also cover any gaps in coverage by setting up additional tests.

Test results monitor 502 may be configured to filter one or more tests and/or test results that are obtained so as to prevent the tests and/or test results from affecting overall accountability of an application, such as, for example, ignoring HTTP tests that end at a destination server with a private IP, ignoring tests targeted at "internal" services hosted on public domains and/or IP addresses (i.e., where the owner of the test is also the owner of given application or service). That is, an "internal" test is essentially test that can only be run by a customer on their own network (or by a testing company with access to the customer network). For instance, if company ABC is the only one who can run tests against ABCApp.com (perhaps because ABCApp is behind a firewall and only ABC devices can access it), then this may be considered as internal. Conversely, if ABCApp.com is accessible to the public, and anyone can test against it, then it can be considered "external". Said differently, "external" may also mean a test that a customer has against a target that they do not own (e.g. company ABC having a test against XYZApp.com). For example, if company ABC is the only customer with tests against ABCApp.com, then test results monitor 502 may ignore and/or filter any data that comes from tests targeting ABCApp.com. But, if there are other customers, for example, company DEF, that also own tests against ABCApp.com, then test results monitor 502 may correspondingly collect and use any data targeting this URL. In other words, if internal tests are the only test against an (app:location), it will not pass the organization threshold above (e.g., requiring at least two orgs, including one external, to have tests against an app:location).

Data enriching component 504 of outage insight service 500 may be configured to enrich data obtained by test results monitor 502. Enriching data, for example, enables outage insight service 500 to not only determine that an application is down, but to also determine one or more insightful details in addition to that, such as geolocating the regions where there are issues, pinpointing specific root causes (e.g., particular data centers, particular accesses, particular portions of applications, etc.), and so on. So, for instance, outage insight service 500 may determine that an application outage is due to a particular data center (e.g., in San Jose), when other data centers (e.g., London) are performing well, otherwise.

It is contemplated that tests and/or test results obtained by test results monitor 502 herein may either provide basic "front door" data of the application page that actually loads in a web browser (e.g., going to a particular application's URL to determine whether the application is accessible), or else deeper facets of an application may be reached through various scripting, API gateways, PageLoad tests, transaction tests, etc. In addition, many applications are hosted across multiple domains, and as such, the techniques herein may also monitor and correlate all of them because they map to different services. In other words, with more data available from the tests, data enriching component 504 is configured to leverage the availability of enriched data as to enable the ability to perform deeper analyses.

Of note, data enriching component 504 is configured to determine and associate a given application outage with server location information (i.e. the location of the outage). Generally, application server location is important in the context of an outage, though perhaps not used directly when applying penalties and thresholds or detecting an outage, as described in greater detail below. As such, special consideration should be made regarding how the location information is derived. For instance, in one embodiment, when possible, data enriching component 504 may obtain a server location from pathtrace data, as it is more accurate than running the serverIp through an IP geolocation service, such as Maxmind. (For instance, pathtrace may be based on using enhanced Traceroute procedures to provide detailed information about interfaces, such as ingress and egress interface names and the number of transmitted and received frames and errors, at each hop in the path between two devices in a fabric, providing an end-to-end view of the network path.) However, due to the way one or more HTTP tests may be performed by a given agent, and their coupled pathtrace, there may be inconsistencies between the server ip/location between HTTP and Pathtrace. Notably, for instance, in one embodiment, a DNS lookup may be performed first, and the resolved IP address is provided to curl and pathtrace. However, if there are redirects involved and the final landing page is hosted on a different IP address, the HTTP and Pathtrace tests will have different serverIps, possibly in different locations. Furthermore, agent task reassignment or failure may result in duplicate documents within a database, which results in IP discrepancies.

In light of these possible discrepancies, data enriching component 504 may be configured to use one or more of following rules to determine if the location of the server should be inferred from Pathtrace or HTTP test (e.g., using an IP to Location mapping service/database): In particular, if pathtrace serverIp is available and HTTP serverIp is missing, the pathtrace server Ip may be used for server location. If both pathtrace serverIp as well as HTTP serverIp are available, and there is a match between the two, the pathtrace server Ip may be used for server location. If both pathtrace serverIp as well as HTTP serverIp are available, but there is no match between the two, then an HTTP test using an IP to Location mapping service/database may be used. If pathtrace serverIp is unavailable and HTTP serverIp is available, the then an HTTP test using an IP to Location mapping service/database may be used.

With more detail regarding mapping, for example of an IP address to a location, contrary to other systems that merely convert IP addresses to geographic locations, e.g., using various known mapping services (which, notably, have generally low accuracy), data enriching component 504 may be configured to leverage and use the plethora of available side channel information to enrich the data confidently to know where those servers are. Tests may be mapped to particular applications based on correlating tests sent to specific URLs or against particular IP addresses. That is, data enriching component 504 may be configured to convert raw test data into "parsed data", where parsing comprises mapping a landing URL to an application (e.g., parsed data will have the full url, the mapping, and curl code, http code, and error messages, etc.).

To perform the mapping, data enriching component 504 may begin with a curated catalog of known applications that map a test's final landing URL to an application (i.e., a catalog entry). Notably, it is important to use the final landing URL, i.e., after all redirects, as opposed to the test configured URL. For example, assume a test to thousandeyes.com gets redirected to okta.com for authentication. If there is an application error in Okta and the test fails when loading okta.com, basing a mapping on a test configuration URL would incorrectly attribute failure of the test to ThousandEyes application instead of Okta. Currently, there are approximately 8,200 applications that could be monitored, though in reality, there are only about 100 significant applications (e.g., mostly enterprise applications) that are of primary interest for most customer-directed testing. A catalog may be configured to provide a mapping from URL to application for these curated applications, such as through regular expression (regex) matching. In particular, regexes may be based on a given test URL's root-domain. Some applications, however, have sub-services identifiable in the subdomain of the URL, and in such cases, data enriching component 504 may use the subdomain for secondary matching. Examples, using wildcards instead of regexes for simplicity, include:

Application name: Salesforce
Wildcard match on root-domain: *.salesforce.com
Example that maps to this application: ap1.salesforce.com→Salesforce
Application name: Google
Wildcard match on root-domain: *.google.*
Wildcard match on sub-domain: mail.google.*→Google Mail
Example that maps to this application: www.google.com-→Google
Example that maps to this application: mail.google.com-→Google Mail Outage insight service 500 may also comprise error classification component 506 that is generally configured to add meaning to issues identified by one or more tests (e.g., of test results monitor 502). Error classification refers to the fact that when a customer sets a test in the environment, and that test has issues, the techniques herein need to be able to know what that error means. That is, error classification component 506 is configured to determine whether this error means that there is an issue with an application or that there's an issue with the agent and the customer, and so on. In other words, after running the tests and obtaining data above, any error codes and error messages may then be used to determine what constitutes an application outage, or otherwise.

Figure 6A:
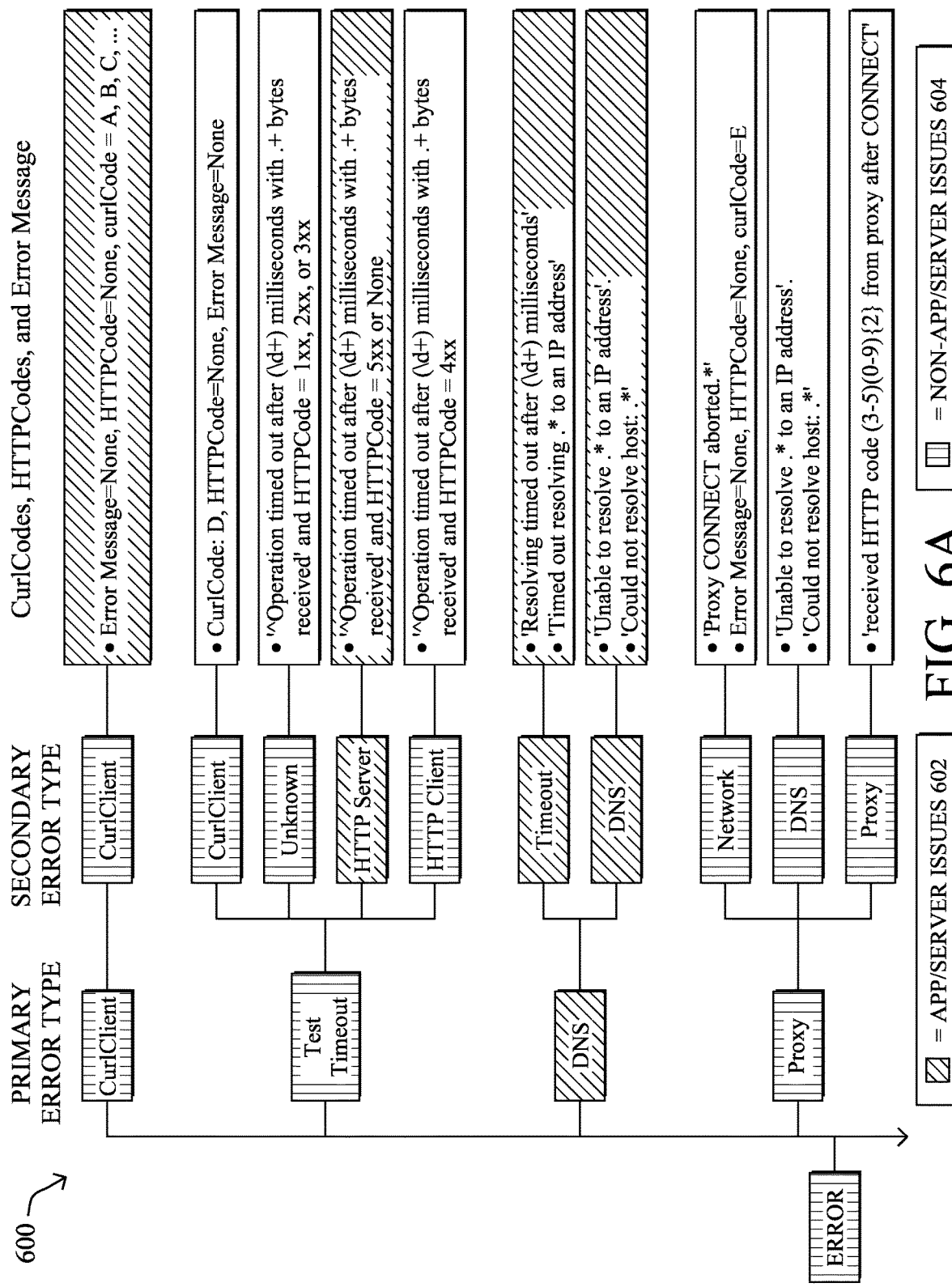
FIGS. 6A-6C illustrates example mappings of error types by an error classification component of an outage insight service.
Figure 6B:
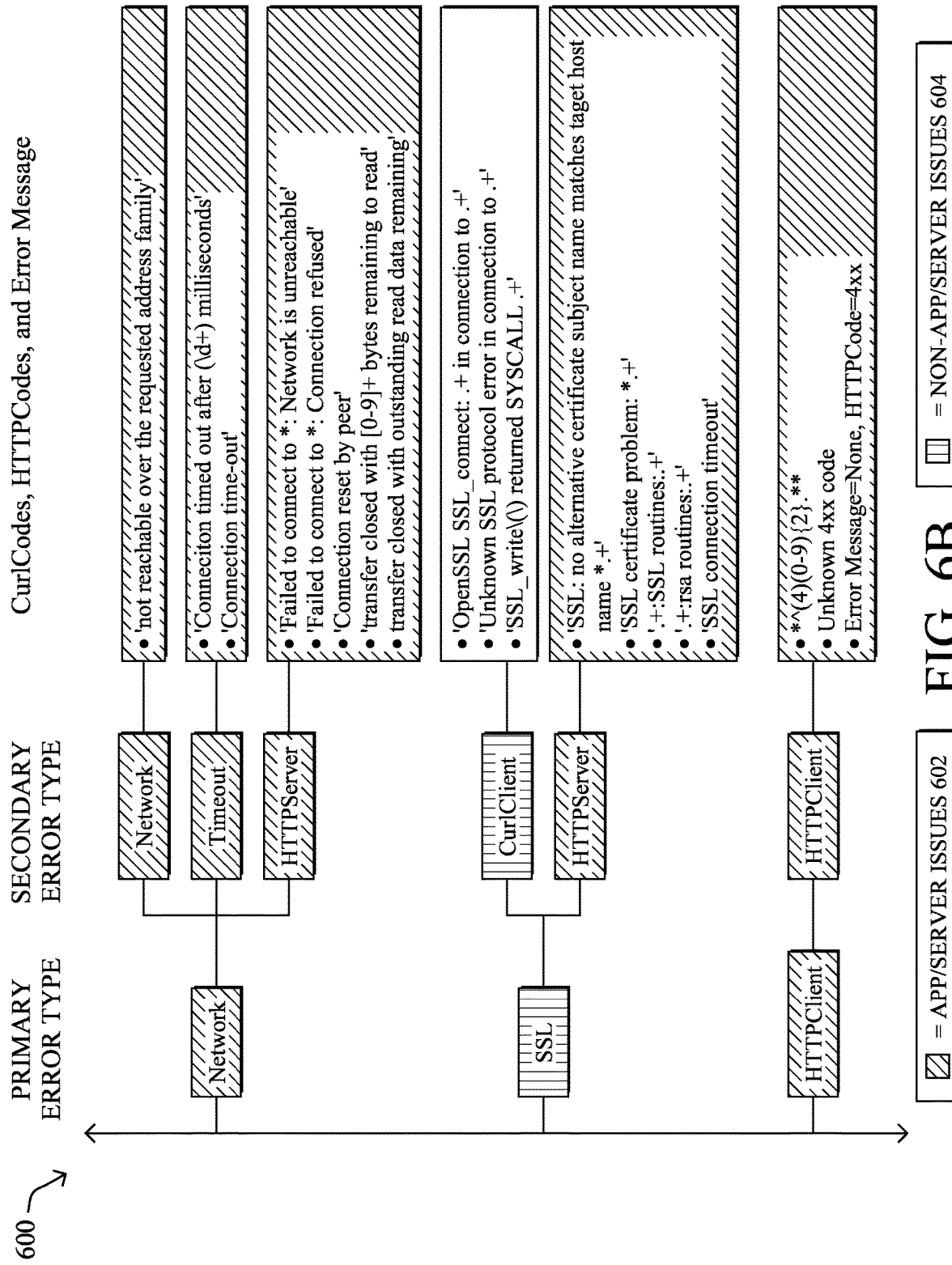
Figure 6C:
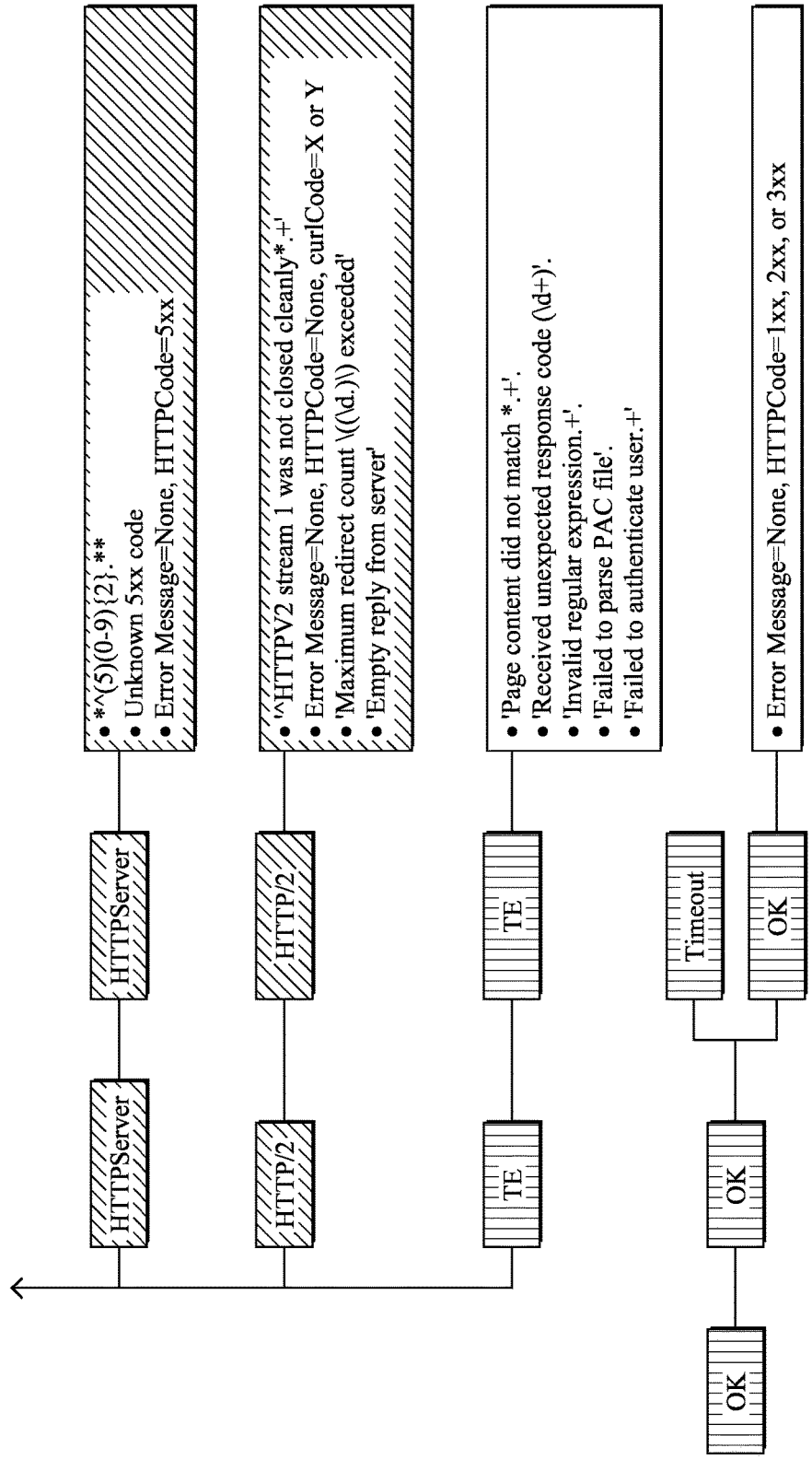

In particular, an example HTTP test, for which results may be obtained by test results monitor 502, is illustratively an HTTP GET request using cURL. This curl request returns at least three data points: cURL return code; HTTP response code; and error messages (e.g., a string describing an error that may be from curl but may sometimes be populated with custom messages, for example, when the HTTP response code is different from what the test configuration is expecting). Each tuple of (Curl Code, HTTP Code, error messages) may then be mapped to a primary and secondary error type by error classification component 506, for example as shown in FIGS. 6A-6C, where in chart 600 (spanning across all of FIGS. 6A-6C), application/server issues may be denoted by a first indicator 602 and non-application/server issues are denoted by a second indicator 604. Accordingly, as shown, error classification component 506 may be configured to identify and select tests that are failing due to application issues. (Note that FIGS. 6A-6C illustrate merely one example of a tree-like structure for what may constitute an organization of primary error types and secondary error types, along with whether they are app/server issues or otherwise, as well as an illustration of corresponding tuple of Curl Code, HTTP Code, and error messages. However, according to the techniques herein, any suitable configuration, arrangement, classification, etc., may be utilized in accordance with various implementations of aspects of the embodiments herein.)

Notably, as previously mentioned, not every error may be indicative of an application outage, and error classification component 506 may be configured to specifically address noise filtering in order to determine which errors should be used (e.g., considered one that is indicative of an application outage). For example, assume that a test is set up, and for some reason, there's some setting in the test that causes that test to fail or hit an unexpected issue, such as proxies, filters, firewalls, etc., or the test is actually to make sure that such filters are working properly. As such, error classification component 506 may be configured to prevent detecting outages based on that data because that data is designed that test is designed to fail. In particular, the techniques herein are configured to be able to know when there are errors. Notably, error classification component 506 may differentiate between when a given error is because an application is having issues, as opposed to when that error is "noise" (e.g., because there is an issue with the agent, or there is an issue with the test, or anything else that produces a false positive). More precisely, error classification determines whether the error is an application error or other types of error (e.g., network), while a "penalty and damping" mechanism as described below informs as to whether something is noise or reliable data.

To this end, error classification component 506 may be configured to apply "Penalty and Damping", wherein a damping mechanism may be used to assign penalties and damp and ignore noisy data. In general terms, the techniques herein use a penalty and damping system to store a test history, and suppress it (i.e., ignore its data) if the history shows instability and noisiness. The techniques herein would then only unsuppress a test (resume using its data) if it shows stable behavior. Other noise filtering techniques may be used herein, such as by generally maintaining a historical state for every test, and ignoring tests with a noisy history.

As an example illustrative damper function, the techniques herein may apply the damping function to keys as below:

A. If a key is seen for the first time, initialize the penalty function (e.g., penalty is set to PENALTY_INITIAL):
  a. Initial state is set to suppressed if the key is down (i.e., is having an application error type);
  b. Initial state is set to unsuppressed if the key is not having an application issue.
B. If a key has been seen before (already has a penalty value and state, i.e. suppressed or unsuppressed):
  a. If the key is down, increase the penalty and update the state if conditions are met*;
  b. If the key is up, decrease the penalty value and update the state if conditions are met*.

(*—If the penalty is unsuppressed and the value is equal or greater than PENALTY_MAX the state is updated to suppressed. If the penalty is suppressed and the value is minor or equal than PENALTY_REUSE the state is updated to unsuppressed.)

C. If a key has been seen before, but the test's configuration url is different from the last time it has been seen, the same logic of A is applied (i.e. a new Penalty is created).

Note that for detecting network outages, in above-mentioned step A.b., the penalty is only initiated if the key is down and never seen before, always setting the initial state to suppressed. However, this would pose an issue with application outages, as the very first outage of most applications are typically not detected, because most, or even sometimes all, keys were suppressed preventing reaching thresholds required to trigger an outage detection. It is contemplated that this is something that should not matter for long runs of "Penalty and Damping" by error classification component 506, but problematic when testing with smaller data batches.

Also note that a given key's penalty is illustratively updated herein only once per round. For example, if a key belonging to a 1-min test is down, even though that key is seen as down five times during a 5-minute-round, the damper function is only applied once, and the penalty is only updated once, during that round.

Regarding the keys used, a Task Key (e.g., AgentId, hostname, testId) may be used for applying penalties and suppression, where if hostname and URL are missing, for example, due to the task having DNS issues, hostname is extracted from test config's URL (as opposed to the final landing URL present in HTTP documents). A Task Server (e.g., hostname, serverIp) may comprise a tuple, where if serverIp is missing (e.g., due to the task having DNS issues), the last seen serverIp for the Task Key above is used. Notably, regarding filling missing hostnames and serverIps, when hostname and serverIp are missing, error classification component 506 may be configured can get hostname from test config's URL, and serverIp from the last seen serverIp for the key.

It is contemplated that this may be achieved by keeping a mapping from (AgentId, testId) to last seen hostname/serverIp, and getting both of those from the last seen, if they are missing. If this is done, however, it generally must be done during parsing, as hostname is required to map tasks to apps (but serverIp can be filled in later during outage detection). While filling hostname from last seen could potentially be more accurate than test config, it may increase complexity when parsing using multiprocessing, causing race conditions and non-deterministic outcome. As a result, at least in one embodiment, error classification component 506 may be configured to fill missing hostnames from test configs during parsing, and serverIp from last seen during outage detection.

Returning to FIG. 5, outage insight service 500 may comprise aggregation engine 508 that is configured to gather enrich test results and monitor outages over stretches of time. This is a particularly fundamental portion in detecting outages, since it may be improper to declare an application outage if, for example, a single test shows an error for a short amount of time (e.g., one minute). Since such an event may occur to a number of things, aggregation engine 508 is configured to perform some aggregation of testing to confirm, by a critical mass, whether the tests are failing (and for the same or similar reasons) before determining an application outage, as opposed to some false positive or other non-trigger.

To accomplish this aggregation, aggregation engine 508 may be configured to implement thresholding. In particular, keys that are not suppressed may be grouped by application, where each group is considered to indicate an outage if it passes the thresholds (e.g., T1-T4) in a table shown in FIG. 7. With reference to a threshold table 700 shown in FIG. 7, a "server" maybe identified by the tuple (hostname, serverIp). As shown in in the example of FIG. 7, a server may be considered down if it is seen as down for THRESHOLD_AGENTID_MIN (T1) or more Agents, while an application is considered to have an outage only if THRESHOLD_SERVER_MIN (T2) or more servers are down. Additionally, other thresholds, such as an illustrative value (T3) for THRESHOLD_SERVER_PERC may be used to define a minimum percentage of all the servers seen for the app that need to be down in order to consider the app down. Another threshold, THRESHOLD_SERVER_MAX (T4) may be used to indicate that if this number of servers belonging to an app are down, then THRESHOLD_SERVER_PERC can be relaxed and the app is considered down. (Also note that certain of the thresholds may also have a "clearing value" less than the threshold value that must be met before an app can be considered to no longer be down, i.e., is back up.)

In summary, outage insight service 500 may be configured to implement various components in detecting application outages, where detection of application outages is based on the culmination of the collection of the data, penalty and damping algorithms (noise filtering), and ultimate aggregation/grouping resulting in a confirmed outage. As noted above, the outage determination may also be associated with enriched data, such as location, server IDs, and other root cause indicators as described above (or otherwise determined). Notably, regarding application outages in general, the techniques herein are specifically well-tailored for dealing with the issues of scale. That is, the techniques herein can give a sense of whether an application is down for the entire world, just a section or the world, and so on, based on large amounts of distributed data collection and associated damping algorithms and aggregation into thresholds. In addition, the techniques herein mitigate against all the noise that comes up with when dealing with testing performed at this scale. For instance, there may always be some point in the world that will be unable to reach a particular application at a particular time due to any number of factors (e.g., Facebook being prevented in China). However, as described above, the techniques herein understand that this doesn't mean there's an "outage" of that application.

Figure 8A:
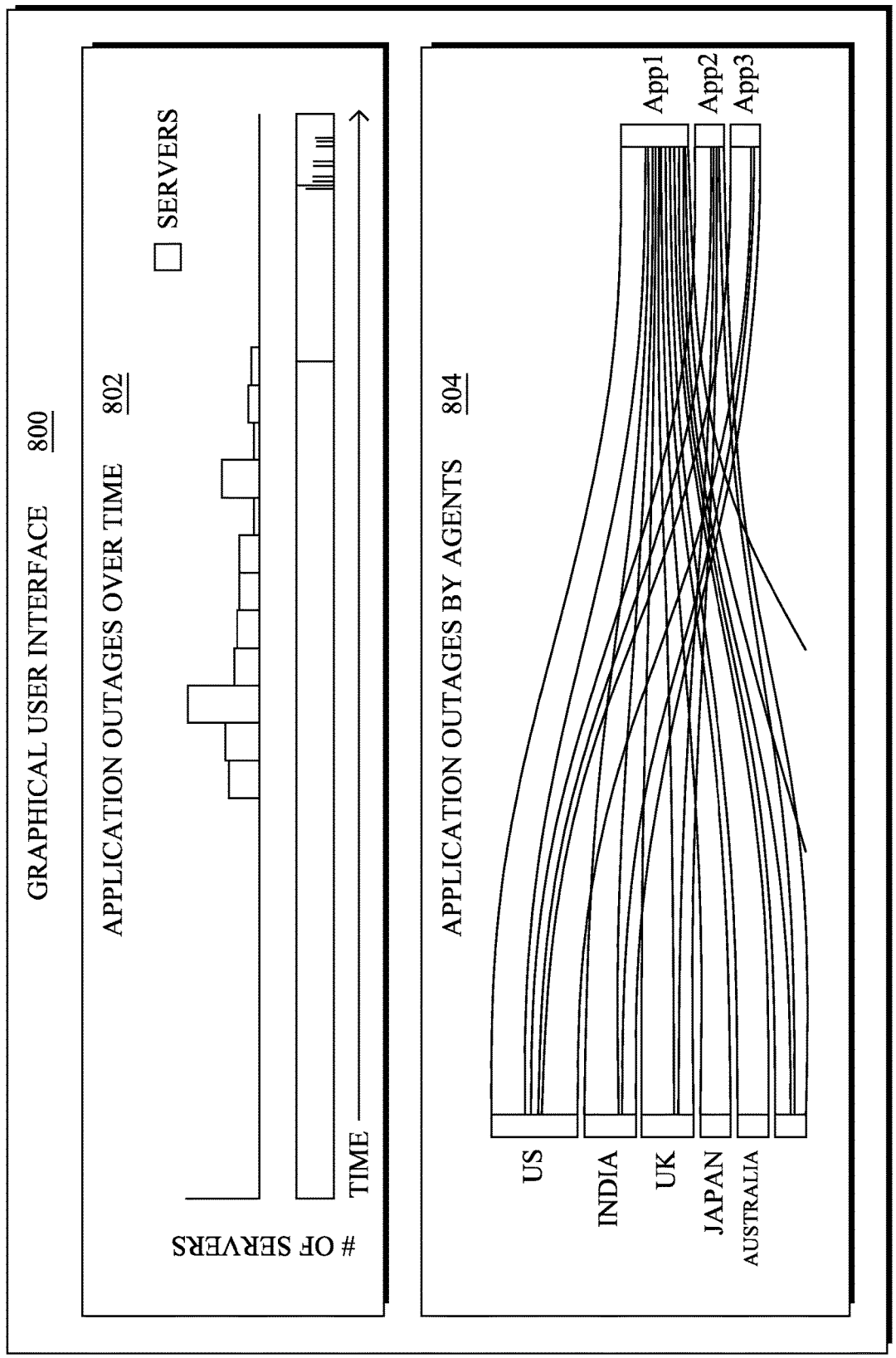
FIGS. 8A-8C illustrate an example user interface displaying a detected application outage.
Figure 8B:
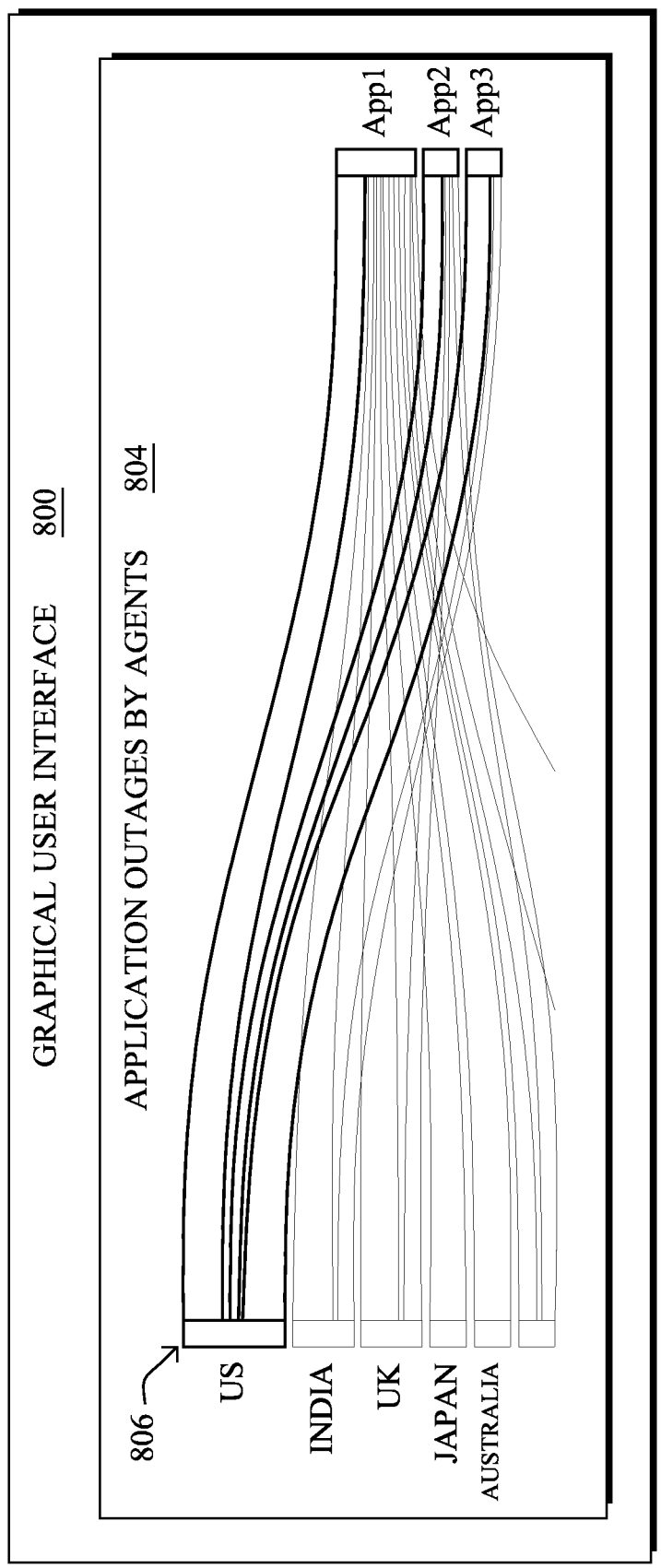
Figure 8C:
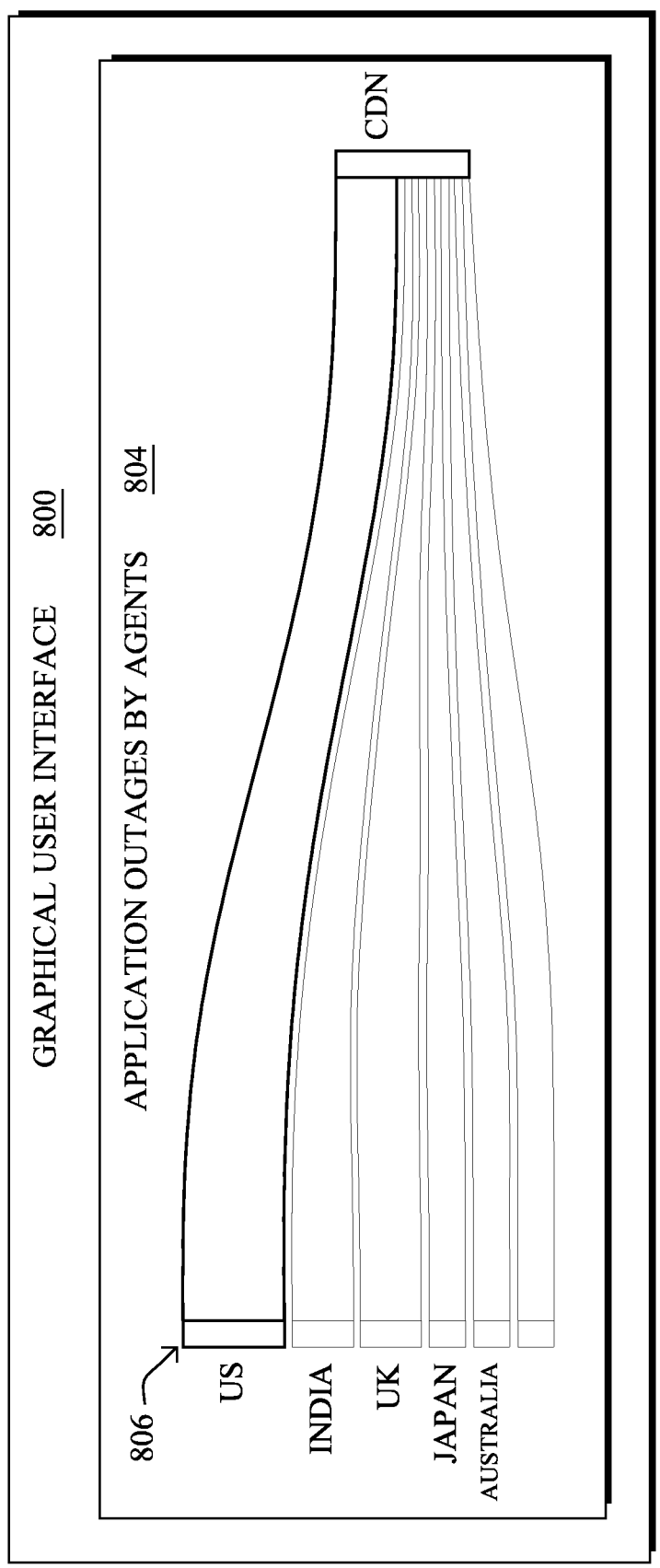

FIGS. 8A-8C illustrate an example user interface displaying a detected application outage, such as with an example content delivery network (CDN). Notably, many applications are typically hosted by a CDN, and as illustrated, this CDN is suffering issues, affecting numerous applications. In FIG. 8A, in graphical user interface 800, a first portion 802 may comprise a time lapse view of declared application outages, while a second portion 804 of graphical user interface 800 the bottom window demonstrates individual groupings of agents (on the left hand side) and their connections to one or more applications (e.g., three, in this example) in a graphical visualization. What this shows, therefore, is, for example, that there were many agents in the United States, United Kingdom, Japan, and so on, that were trying to connect to three applications, and they were not able to, thus triggering the detection of an application outage for those three applications. It is contemplated that graphical user interface 800 may include a plurality of notifications that are indicative of the application outage. Further, such notifications may include instructions, alerts, etc. regarding the application outage, which altogether may cause a mitigation action to be performed (e.g., automatically, by an end user, etc.).

In FIG. 8B, a user may select a particular grouping of agents 806 of second portion 804 (e.g., agents in the United States), thereby indicating connections of agents from that region to applications. However, upon drilling down further into the enriched data collected above, FIG. 8C demonstrates how the techniques herein can align this particular nation's grouping of outage destinations, to show that the common denominator here is the underlying content delivery network (CDN) that all the down applications are hosted on.

Since the techniques described above are directed at application outages, many specific considerations have been made to account for nuances in applications that are not found in traditional network outage detection. For example, contrary to network outage detection, application outage is not based on path traces, but instead from HTTP requests, PageLoads, transaction tests, and so on. Also, the error classification has been specifically developed for application outages, as well as the noise filtering, and aggregation components above, as well as other enriched data, each particularly to assist in classifying issues as an application error as opposed to something else. That is, the data and processes are very different, because with applications you get semantic errors, not explicit network errors. Mapping addresses to applications also is not necessary in network outages.

Figure 9:
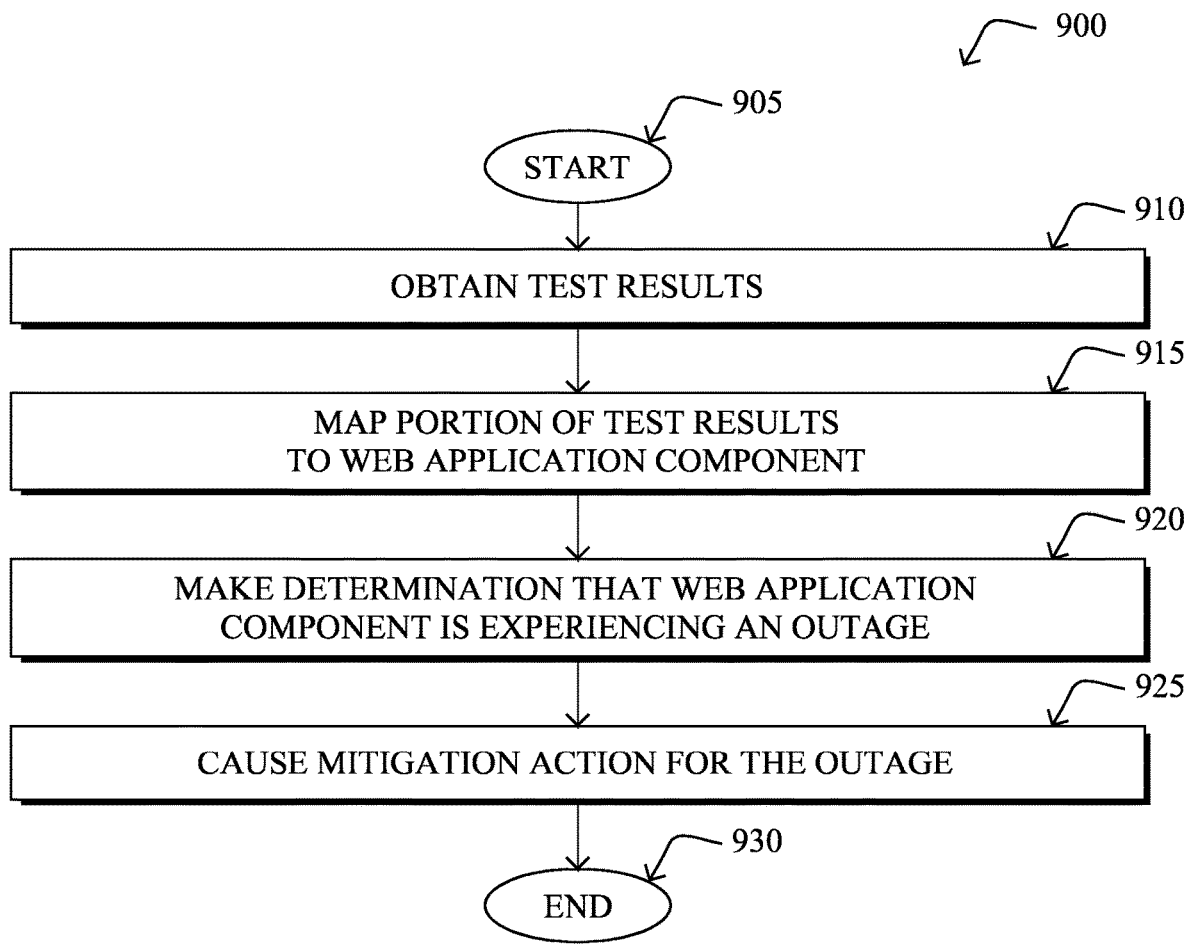
FIG. 9 illustrates an example simplified procedure for enriched application outage insights in accordance with one or more embodiments described herein.

In closing, FIG. 9 illustrates an example simplified procedure for enrich application outage insights, in accordance with one or more embodiments described herein. For example, a non-generic, specifically configured device (e.g., device 200, particularly a monitoring device) may perform procedure 900 by executing stored instructions (e.g., process 248) that include an agent to monitor application outage(s). The procedure 900 may start at step 905, and continues to step 910, where, as described in greater detail above, the device may obtain test results for tests targeted at a web application, the tests performed by a plurality of agents. In one embodiment, the tests performed by the plurality of agents may be selected from a group consisting of HTTP requests, page load tests, transaction tests, and network tests. Particularly, the tests may be sent, managed, initiated, etc. by any given agent as described herein above. In one or more embodiments, the instrumentation code may be inserted by a core agent into the online application.

At step 915, as detailed above, the device may map a portion of the test results to a component of the web application based on identifying information within the portion of the test results. In one embodiment, the device may map the portion of the test results after the device determines that a sufficient number of tests results for the tests targeted at the web application have been gathered. In one or more embodiments, the device may map the portion of the test results after the device filters out internal test results for the web application. In an embodiment, map a portion of the test results to a component of the web application may comprise the device associating server location information with the outage. Particularly, associating the server location information with the outage may be based on an HTTP test or using an internet protocol to location mapping service.

At step 920, the device may make, based on the portion of the test results that are mapped to the component of the web application, a determination that the component of the web application is experiencing an outage. In one or more embodiments, making the determination that the component of the web application is experiencing the outage may comprise the device performing error classification on the portion of the test results. As would be appreciated, the error classification may comprise a penalty and damping mechanism. In one or more embodiments, making the determination that the component of the web application is experiencing the outage may comprise the device determining that an aggregated number of test results indicate that the outage is occurring In one embodiment, at step 925, as detailed above, the device may cause, based on the determination that the component of the web application is experiencing the outage, a mitigation action for the outage. In one or more embodiments, the mitigation action for the outage may comprise displaying a graphical visualization at a graphical user interface The procedure 900 may then end in step 930, notably with the ability to continue ingesting and processing data. Other steps may also be included generally within procedure 900.

It should be noted that while certain steps within procedure 900 may be optional as described above, the steps shown in FIG. 9 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide enriched application outage insights. Of note, the techniques herein detect application outages at scale with synthetic testing in an automated way (i.e., without requiring humans to signal an issue). For instance, rather than conventional techniques where applications rely on user feedback that they're having issues with some application, the techniques herein go much further to not only automatically detect and report such outages, but also to provide additional detail on the outage (e.g., which users can or cannot access an application, where those users are located, where that application is hosted, why that application is not accessible, etc.), based on error classification, root cause analysis, and so on In addition, the techniques herein can cover many applications with created synthetic tests without relying on existing user tests. That is, while most network tests are challenging to achieve broad coverage for testing (e.g., much more manual configuration of tests, determination of network topologies to test, customer cooperation and coordination, and so on), the techniques herein, on the other hand, merely need to instruct various agents already in place to monitor a given set of applications (e.g., URLs) to watch for associated outages, accordingly, regardless of their location or topology.

Illustratively, the techniques described herein may be performed by hardware, software, and/or firmware, such as in accordance with the illustrative outage insight process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: obtaining, at a device, test results for tests targeted at a web application, the tests performed by a plurality of agents; mapping, by the device, a portion of the test results to a component of the web application based on identifying information within the portion of the test results; and making, by the device and based on the portion of the test results that are mapped to the component of the web application, a determination that the component of the web application is experiencing an outage. In one embodiment, the method further comprises: causing, by the device and based on the determination that the component of the web application is experiencing the outage, a mitigation action for the outage.

In one embodiment, the tests performed by the plurality of agents are selected from a group consisting of HTTP requests, page load tests, transaction tests, and network tests. In another embodiment, mapping the portion of the test results to the component of the web application is performed after determining, by the device, that a sufficient number of tests results for the tests targeted at the web application have been gathered. In a further embodiment, mapping the portion of the test results to the component of the web application is performed after filtering out, by the device, internal test results for the web application. In yet another embodiment, mapping the portion of the test results to the component of the web application comprises: associating, by the device, server location information with the outage. In another embodiment, associating the server location information with the outage is based on an HTTP test or using an internet protocol to location mapping service. In an additional embodiment, making the determination that the component of the web application is experiencing the outage comprises performing, by the device, error classification on the portion of the test results. In a further embodiment, the error classification comprises a penalty and damping mechanism. In yet another embodiment, making the determination that the component of the web application is experiencing the outage comprises determining, by the device, that an aggregated number of test results indicate that the outage is occurring. In another embodiment, the mitigation action for the outage comprises displaying a graphical visualization at a graphical user interface.

According to the embodiments herein, an illustrative tangible, non-transitory, computer-readable medium herein may have computer-executable instructions stored thereon that, when executed by a processor on a device, may cause the device to perform a method comprising: obtaining test results for tests targeted at a web application, the tests performed by a plurality of agents; mapping a portion of the test results to a component of the web application based on identifying information within the portion of the test results; and making, based on the portion of the test results that are mapped to the component of the web application, a determination that the component of the web application is experiencing an outage. In one embodiment, the method further comprises: causing, based on the determination that the component of the web application is experiencing the outage, a mitigation action for the outage.

Further, according to the embodiments herein an illustrative apparatus herein may comprise: one or more network interfaces to communicate with a network; a processor coupled to the network interfaces and configured to execute one or more processes; and a memory configured to store a process executable by the processor, the process, when executed, configured to: obtain test results for tests targeted at a web application, the tests performed by a plurality of agents; map portion of the test results to a component of the web application based on identifying information within the portion of the test results; and make, based on the portion of the test results that are mapped to the component of the web application, a determination that the component of the web application is experiencing an outage. In one embodiment, the process, when executed, is further configured to: cause, based on the determination that the component of the web application is experiencing the outage, a mitigation action for the outage.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by an agent", "by a server", or "by a controller," those skilled in the art will appreciate that agents of the application intelligence platform (e.g., application agents, network agents, language agents, etc.) may be considered to be extensions of the server (or controller) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    obtaining, at a device, test results for tests targeted at a web application, the tests performed by a plurality of agents;
    mapping, by the device, a portion of the test results to a component of the web application based on identifying information within the portion of the test results; and
    making, by the device and based on the portion of the test results that are mapped to the component of the web application, a determination that the component of the web application is experiencing an outage.

2. The method as in claim 1, wherein the tests performed by the plurality of agents are selected from a group consisting of HTTP requests, page load tests, transaction tests, and network tests.

3. The method as in claim 1, wherein mapping the portion of the test results to the component of the web application is performed after determining, by the device, that a sufficient number of tests results for the tests targeted at the web application have been gathered.

4. The method as in claim 1, wherein mapping the portion of the test results to the component of the web application is performed after filtering out, by the device, internal test results for the web application.

5. The method as in claim 1, wherein mapping the portion of the test results to the component of the web application comprises:
    associating, by the device, server location information with the outage.

6. The method as in claim 5, wherein associating the server location information with the outage is based on an HTTP test or using an internet protocol to location mapping service.

7. The method as in claim 1, wherein making the determination that the component of the web application is experiencing the outage comprises performing, by the device, error classification on the portion of the test results.

8. The method as in claim 7, wherein the error classification comprises a penalty and damping mechanism.

9. The method as in claim 1, wherein making the determination that the component of the web application is experiencing the outage comprises determining, by the device, that an aggregated number of test results indicate that the outage is occurring.

10. The method as in claim 1, further comprising:
    causing, by the device and based on the determination that the component of the web application is experiencing the outage, a mitigation action for the outage.

11. The method as in claim 10, wherein the mitigation action for the outage comprises displaying a graphical visualization at a graphical user interface.

12. A tangible, non-transitory, computer-readable medium having computer-executable instructions stored thereon that, when executed by a processor on a computer, cause the computer to perform a method comprising:
    obtaining test results for tests targeted at a web application, the tests performed by a plurality of agents;
    mapping a portion of the test results to a component of the web application based on identifying information within the portion of the test results; and
    making, based on the portion of the test results that are mapped to the component of the web application, a determination that the component of the web application is experiencing an outage.

13. The tangible, non-transitory, computer-readable medium as in claim 12, wherein the method further comprises:
    causing, based on the determination that the component of the web application is experiencing the outage, a mitigation action for the outage.

14. The tangible, non-transitory, computer-readable medium as in claim 12, wherein mapping the portion of the test results to the component of the web application is performed after determining that a sufficient number of tests results for the tests targeted at the web application have been gathered.

15. The tangible, non-transitory, computer-readable medium as in claim 12, wherein mapping the portion of the test results to the component of the web application is performed after filtering out internal test results for the web application.

16. The tangible, non-transitory, computer-readable medium as in claim 12, wherein mapping the portion of the test results to the component of the web application comprises:
    associating server location information with the outage.

17. The tangible, non-transitory, computer-readable medium as in claim 12, wherein making the determination that the component of the web application is experiencing the outage comprises performing error classification on the portion of the test results.

18. The tangible, non-transitory, computer-readable medium as in claim 17, wherein the error classification comprises a penalty and damping mechanism.

19. The tangible, non-transitory, computer-readable medium as in claim 12, wherein making the determination that the component of the web application is experiencing the outage comprises determining that an aggregated number of test results indicate that the outage is occurring.

20. An apparatus, comprising:
    one or more network interfaces to communicate with a network;
    a processor coupled to the one or more network interfaces and configured to execute one or more processes; and
    a memory configured to store a process that is executable by the processor, the process, when executed, configured to:
        obtain test results for tests targeted at a web application, the tests performed by a plurality of agents;
        map a portion of the test results to a component of the web application based on identifying information within the portion of the test results; and make, based on the portion of the test results that are mapped to the component of the web application, a determination that the component of the web application is experiencing an outage.

\* \* \* \* \*